United States Patent
Liu

(10) Patent No.: US 11,291,035 B2
(45) Date of Patent: Mar. 29, 2022

(54) INFORMATION TRANSMITTING METHOD AND APPARATUS, BASE STATION, AND USER EQUIPMENT

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/051,561

(22) PCT Filed: May 3, 2018

(86) PCT No.: PCT/CN2018/085487
§ 371 (c)(1),
(2) Date: Oct. 29, 2020

(87) PCT Pub. No.: WO2019/210488
PCT Pub. Date: Nov. 7, 2019

(65) Prior Publication Data
US 2021/0235480 A1    Jul. 29, 2021

(51) Int. Cl.
*H04W 4/00* (2018.01)
*H04W 72/12* (2009.01)
*H04W 76/27* (2018.01)

(52) U.S. Cl.
CPC ... *H04W 72/1289* (2013.01); *H04W 72/1257* (2013.01); *H04W 76/27* (2018.02)

(58) Field of Classification Search
USPC .................. 370/328, 329, 330, 331
See application file for complete search history.

(56) References Cited

U.S. PATENT DOCUMENTS 9,295,040 B2    3/2016    Hooli et al.
2010/0113058 A1    5/2010    Wu
(Continued)

FOREIGN PATENT DOCUMENTS

CN    101730253 A    6/2010
CN    106465391 A    2/2017
(Continued)

OTHER PUBLICATIONS

Combined Chinese Office Action and Search Report dated Mar. 16, 2021 in Chinese Patent Application No. 201880000649.X (with English translation), 14 pages.
(Continued)

*Primary Examiner* — David Q Nguyen
(74) *Attorney, Agent, or Firm* — Oblon, McClelland, Maier & Neustadt, L.L.P.

(57) ABSTRACT

Aspects of the disclosure relates to an information transmitting method and apparatus. The information transmitting method can include adding, by means of a control unit, an information element (IE) to radio resource control (RRC) signaling configured for the SPS scheduling, the IE being used for indicating a reference value of the number of candidate positions of the SPS scheduling unit of the UE, and transmitting the RRC signaling carrying the reference value of the number of candidate positions and period information of the SPS scheduling unit to the UE. According to the present embodiment, the RRC signaling carrying the reference value of the number of candidate positions and the periodic information of the SPS scheduling unit is transmitted to the UE, so that the UE can determine the number of candidate positions according to the received RRC signaling, and receive the SPS scheduling unit at the candidate position.

9 Claims, 14 Drawing Sheets

An IE is added by a control unit to RRC signaling configured for SPS scheduling — S101

RRC signaling carrying the reference value of the number of candidate positions and period information of the SPS scheduling unit is transmitted to the UE — S102

(56) References Cited

U.S. PATENT DOCUMENTS

| | | | | |
|---|---|---|---|---|
| 2012/0257559 | A1* | 10/2012 | Kim | H04L 1/1883 370/311 |
| 2013/0301582 | A1* | 11/2013 | Jiang | H04W 72/042 370/329 |
| 2014/0133365 | A1* | 5/2014 | Peng | H04L 5/0092 370/278 |
| 2015/0257144 | A1 | 9/2015 | Hooli et al. | |
| 2017/0026942 | A1 | 1/2017 | Vajapeyam et al. | |
| 2018/0103460 | A1 | 4/2018 | Sharma et al. | |
| 2018/0279274 | A1* | 9/2018 | Sun | H04L 1/1864 |
| 2019/0132092 | A1* | 5/2019 | Chen | H04L 1/1896 |
| 2019/0191416 | A1* | 6/2019 | Xie | H04W 72/04 |
| 2019/0253904 | A1* | 8/2019 | Tsai | H04L 5/0094 |
| 2020/0374748 | A1* | 11/2020 | Ahn | H04W 72/12 |
| 2021/0037463 | A1* | 2/2021 | Ahn | H04W 72/042 |
| 2021/0152315 | A1* | 5/2021 | Belleschi | H04W 72/0406 |

FOREIGN PATENT DOCUMENTS

| | | |
|---|---|---|
| CN | 107295643 A | 10/2017 |
| CN | 107333334 A | 11/2017 |
| CN | 107852716 A | 3/2018 |
| CN | 108702777 A | 10/2018 |
| CN | 107333334 B | 1/2020 |
| WO | WO 2018/032000 A1 | 2/2018 |

OTHER PUBLICATIONS

International Search Report dated Dec. 10, 2018 in PCT/CN2018/085487 (submitting English translation only), 2 pages.

Written Opinion of the International Searching Authority dated Dec. 10, 2018 in PCT/CN2018/085487 (submitting English translation only), 3 pages.

Ericsson. "RRC Reconfiguration of SPS-Config", 3GPP TSG-RAN WG2 RAN2#101, Tdoc R2-1803537, Mar. 2, 2018 (Mar. 2, 2018), pp. 1-3.

Office Action of the Indian application No. 202047052498, dated Dec. 13, 2021 (with partial English translation) (6 pages).

ZTE: "Consideration on SPS", 3GPP Draft; R2-1704698 Consideration on SPS, 3rd Generation Partnership Project (3GPP), Mobile Competence Centre: 650, Route Des Lucioles; F-06921 Sophia-Antipolis Cedex; France, vol. RAN WG2, No. Hangzhou, China; May 15, 2017-May 19, 2017, May 5, 2017 (May 5, 2017), XP051263869 (5 pages).

LG Electronics Inc: "Consideration on SPS for NB-IoT", 3GPP Draft; R2-1708852 Consideration on SPS for NB—Iot, 3rd Generation Partnership Project (3GPP), Mobile Competence Centre; 650, Route Des Lucioles; F-06921 Sophia-Ant Ipolis Cedex; France, vol. RAN WG2, No. Berlin,Germany; Aug. 21, 2017-Aug. 25, 2017, Aug. 20, 2017 (Aug. 20, 2017), XP051318655 (2 pages).

Supplementary European Search Report in the corresponding European application No. 18917216.6, dated Jan. 7, 2022 (9 pages).

* cited by examiner

INFORMATION TRANSMITTING METHOD AND APPARATUS, BASE STATION, AND USER EQUIPMENT

RELATED APPLICATION

This application claims the benefit of International Application No. PCT/CN2018/085487, entitled "INFORMATION TRANSMITTING METHOD AND APPARATUS, BASE STATION, AND USER EQUIPMENT" and filed on May 3, 2018, which is incorporated herein by reference in its entirety.

TECHNICAL FIELD

The present disclosure relates to the technical field of communications, including to a method and apparatus for transmitting information, a method and apparatus for demodulating a Semi-Persistent Scheduling (SPS) scheduling unit, a base station, User Equipment (UE) and a computer-readable storage medium.

BACKGROUND

With the rapid development of wireless communication technologies, there emerges the 5th Generation (5G) mobile communication technology. The 5G New Radio Unlicensed Spectrum (NR-U) has been approved by the 3rd Generation Partnership Project (3GPP) recently for research. According to most points of view, the NR-U may support independent networking, and designs in 5G New Radio (NR) should be inherited to the NR-U as much as possible. Concerning the designs of the unlicensed spectrum, relevant regulations in respective regions of the world should be taken into account first, for example, the Listen before Talk (LBT). That is, the energy must be detected first before a signal is transmitted.

Both the 4th Generation (4G) mobile communication technology and the 5G involve an SPS technology. For regularly transmitted data packets such as Voice over Internet Protocol (VoIP), a semi-persistent resource allocation manner is used. In other words, after a resource is allocated once, the resource appears periodically and can be used for multiple times. After the SPS is activated, a base station does not need Downlink Control Information (DCI) scheduling, and a UE may directly use a reserved resource.

However, because of the LBT, there is a high possibility that data cannot be transmitted on the NR-U at a certain SPS occasion, thus missing the SPS occasion. If the base station adopts dynamic allocation after the missing, although such a defect may be made up, it needs to be dynamically scheduled with DCI, which wastes Physical Downlink Control Channel (PDCCH) resources and reduces the benefits of the SPS.

In the related art, after the SPS occasion is occupied, the SPS occasion will be abandoned. If there is still data to be transmitted at the SPS occasion, the only way is to dynamically schedule the UE once at a subsequent transmitting occasion. However, there is a high probability that the SPS occasion collision occurs, which wastes more public control channel resources.

SUMMARY

In view of this, the present disclosure discloses a method and apparatus for transmitting information, a method and apparatus for demodulating an SPS scheduling unit, a base station, a UE and a computer-readable storage medium, which transmits, through Radio Resource Control (RRC) signaling, a reference value of the number of candidate positions for the SPS scheduling unit of the UE, such that the UE may determine the number of candidate positions, and receive the SPS scheduling unit at a candidate position, thereby reducing the number of times that the base station schedules the SPS scheduling unit and reducing the waste of public control channel resources.

According to a first aspect of the present disclosure, there is provided a method for transmitting information, which may be applied to a base station. The base station includes a control unit. The method can include that an Information Element (IE) is added by the control unit to RRC signaling configured for SPS scheduling, the IE being configured to indicate a reference value of a number of candidate positions for an SPS scheduling unit of a UE, and RRC signaling carrying the reference value of the number of candidate positions and period information of the SPS scheduling unit is transmitted to the UE.

In an embodiment, the method may further include that configuration information is generated by the control unit, the configuration information being configured to indicate whether the IE needs to be added to the RRC signaling. Additionally, the operation that the IE is added to the RRC signaling configured for the SPS scheduling may include that the IE is added to the RRC signaling after it is determined according to the configuration information that the IE needs to be added to the RRC signaling.

In an embodiment, the base station further includes a scheduler. The method may further include that DCI carrying relevant information of the SPS scheduling unit is generated by the scheduler, the relevant information of the SPS scheduling unit including the number of candidate positions, or the relevant information of the SPS scheduling unit including the number of candidate positions and a position spacing of the SPS scheduling unit. The DCI can be transmitted through a PDCCH, where the reference value of the number of candidate positions is the same with or different from the number of candidate positions.

According to a second aspect of the present disclosure, there is provided a method for demodulating an SPS scheduling unit, which may be applied to a UE. The method can include that a number of candidate positions and period information configured by a base station for an SPS scheduling unit of the UE are determined, and a position spacing of the SPS scheduling unit is determined. Further, the method can include that an SPS occasion allocated by the base station to the UE is acquired, responsive to that the SPS scheduling unit is not received during the SPS occasion, a candidate position of the SPS scheduling unit is determined according to the number of candidate positions, the position spacing and the period information, and the SPS scheduling unit is received at the candidate position.

In an embodiment, the operation that the number of candidate positions and the period information configured by the base station for the SPS scheduling unit of the UE are determined may include that RRC signaling transmitted by the base station and configured for SPS scheduling is received, a reference value of the number of candidate positions and the period information are parsed from the RRC signaling, and the reference value of the number of candidate positions is determined as the number of candidate positions.

In an embodiment, the operation that the number of candidate positions and the period information configured by the base station for the SPS scheduling unit of the UE are determined may include that the DCI transmitted by the base station through a PDCCH is received, and the DCI is demodulated to obtain the number of candidate positions.

In an embodiment, the operation that the position spacing of the SPS scheduling unit is determined may include that the position spacing is determined based on an agreed manner, or the received DCI is demodulated to obtain the position spacing.

According to a third aspect of the present disclosure, there is provided an apparatus for transmitting information, which may be applied to a base station. The apparatus can include an addition module that is configured to add an IE to RRC signaling configured for SPS scheduling, the IE being configured to indicate a reference value of a number of candidate positions for an SPS scheduling unit of a UE, and a first transmitting module that is configured to transmit RRC signaling carrying the reference value added by the addition module of the number of candidate positions and period information of the SPS scheduling unit to the UE.

In an embodiment, the apparatus may further include a first generation module that is configured to generate configuration information, the configuration information being configured to indicate whether the IE needs to be added to the RRC signaling. The addition module is configured to add the IE to the RRC signaling after determining according to the configuration information generated by the first generation module that the IE needs to be added to the RRC signaling.

In an embodiment, the apparatus may further include a second generation module that is configured to generate DCI which carries relevant information of the SPS scheduling unit, the relevant information of the SPS scheduling unit including the number of candidate positions, or the relevant information of the SPS scheduling unit including the number of candidate positions and a position spacing of the SPS scheduling unit, and a second transmitting module that is configured to transmit, through a PDCCH, the DCI generated by the second generation module. The reference value of the number of candidate positions is the same with or different from the number of candidate positions.

According to a fourth aspect of the present disclosure, there is provided an apparatus for demodulating an SPS scheduling unit, which may be applied to a UE. The apparatus can include a first determination module that is configured to determine a number of candidate positions and period information configured by a base station for an SPS scheduling unit of the UE, a second determination module that is configured to determine a position spacing of the SPS scheduling unit, and an acquisition module that is configured to acquire an SPS occasion which is allocated by the base station to the UE. The apparatus can further include a third determination module that is configured to determine, responsive to that the SPS scheduling unit is not received during the SPS occasion acquired by the acquisition module, a candidate position of the SPS scheduling unit according to the number of candidate positions determined by the first determination module, the period information and the position spacing determined by the second determination module, and a receiving module that is configured to receive the SPS scheduling unit at the candidate position determined by the third determination module.

In an embodiment, the first determination module may include a first receiving submodule that is configured to receive RRC signaling which is transmitted by the base station and configured for SPS scheduling, an parsing submodule that is configured to parse a reference value of the number of candidate positions and the period information from the RRC signaling received by the first receiving submodule, and a determination submodule that is configured to determine the reference value of the number of candidate positions that is parsed from the parsing submodule as the number of candidate positions.

In an embodiment, the first determination module may include a second receiving submodule that is configured to receive DCI which is transmitted by the base station through a PDCCH, and a demodulation submodule that is configured to demodulate the DCI received by the second receiving submodule to obtain the number of candidate positions.

In an embodiment, the second determination module may include a first determination submodule that is configured to determine the position spacing based on an agreed manner, or a second determination submodule that is configured to demodulate the received DCI to obtain the position spacing.

According to a fifth aspect of the present disclosure, there is provided a base station. The base station may include a processor and a memory configured to store instructions executable for the processor. The processor can be configured to add an IE by the control unit to RRC signaling configured for SPS scheduling, the IE being configured to indicate a reference value of a number of candidate positions for an SPS scheduling unit of a UE, and transmit RRC signaling carrying the reference value of the number of candidate positions and period information of the SPS scheduling unit to the UE.

According to a sixth aspect of the present disclosure, there is provided a UE. The UE may include a processor and a memory configured to store instructions executable for the processor. The processor can be configured to determine a number of candidate positions and period information configured by a base station for an SPS scheduling unit of the UE determine a position spacing of the SPS scheduling unit, and acquire an SPS occasion which is allocated by the base station to the UE. The processor can be further configured to determine, responsive to that the SPS scheduling unit is not received during the SPS occasion, a candidate position of the SPS scheduling unit according to the number of candidate positions, the position spacing and the period information, and receive the SPS scheduling unit at the candidate position.

According to a seventh aspect of the embodiments of the present disclosure, there is provided a computer-readable storage medium, on which computer instructions are stored. The instructions are executed by a processor to implement the steps of the method for transmitting the information.

According to an eighth aspect of the present disclosure, there is provided a computer-readable storage medium, on which computer instructions are stored. The instructions are executed by a processor to implement the steps of the method for demodulating the SPS scheduling unit.

The technical solutions provided by the embodiments of the present disclosure may have several beneficial effects. For example, through adding the IE configured to indicate the reference value of the number of candidate positions for the SPS scheduling unit of the UE to the RRC signaling configured for the SPS scheduling, and transmitting the RRC signaling carrying the reference value of the number of candidate positions and the period information of the SPS scheduling unit to the UE, the UE may determine the number of candidate positions according to the received RRC signaling, and receive the SPS scheduling unit at a candidate position, thereby reducing the number of times that the base station schedules the SPS scheduling unit, and reducing the waste of public control channel resources.

If the SPS scheduling unit is not received during the allocated SPS occasion, the candidate position of the SPS scheduling unit is determined according to the received number of candidate positions, the position spacing and the period information, and the SPS scheduling unit is received at the candidate position, such that the number of times that the base station schedules the SPS scheduling unit is reduced, and the waste of public control channel resources is reduced.

It should be understood that the above general descriptions and detailed descriptions below are only exemplary and explanatory, and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
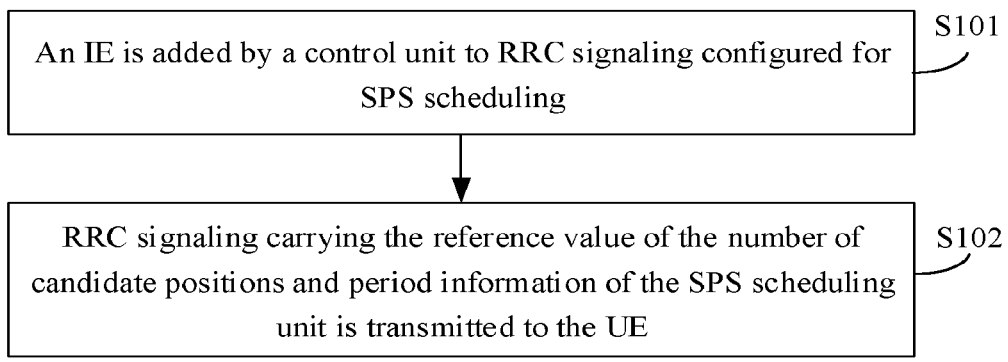
FIG. 1 illustrates a flowchart of a method for transmitting information according to an exemplary embodiment of the present disclosure.

FIG. 1 illustrates a flowchart of a method for transmitting information according to an exemplary embodiment of the present disclosure. The embodiment is described from a base station side. As illustrated in FIG. 1, the method for transmitting the information may include the following steps.

In step S101, an IE is added by a control unit to RRC signaling configured for SPS scheduling, the IE being configured to indicate a reference value of a number of candidate positions for an SPS scheduling unit of a UE. The base station includes the control unit. In the embodiment, the control unit may add the IE to the RRC signaling configured for the SPS scheduling. The IE is configured to indicate the reference value of the number of candidate positions for the SPS scheduling unit of the UE.

In step S102, RRC signaling carrying the reference value of the number of candidate positions and period information of the SPS scheduling unit is transmitted to the UE. After adding the IE configured to indicate the reference value of the number of candidate positions for the SPS scheduling unit of the UE to the RRC signaling configured for the SPS scheduling, the control unit of the base station may transmit the RRC signaling carrying the reference value of the number of candidate positions and the period information of the SPS scheduling unit to the UE.

In the above embodiment, through adding the IE configured to indicate the reference value of the number of candidate positions for the SPS scheduling unit of the UE to the RRC signaling configured for the SPS scheduling, and transmitting the RRC signaling carrying the reference value of the number of candidate positions and the period information of the SPS scheduling unit to the UE, the UE may determine the number of candidate positions according to the received RRC signaling, and receive the SPS scheduling unit at a candidate position, thereby reducing the number of times of scheduling the SPS scheduling unit, and reducing the waste of public control channel resources.

Figure 2:
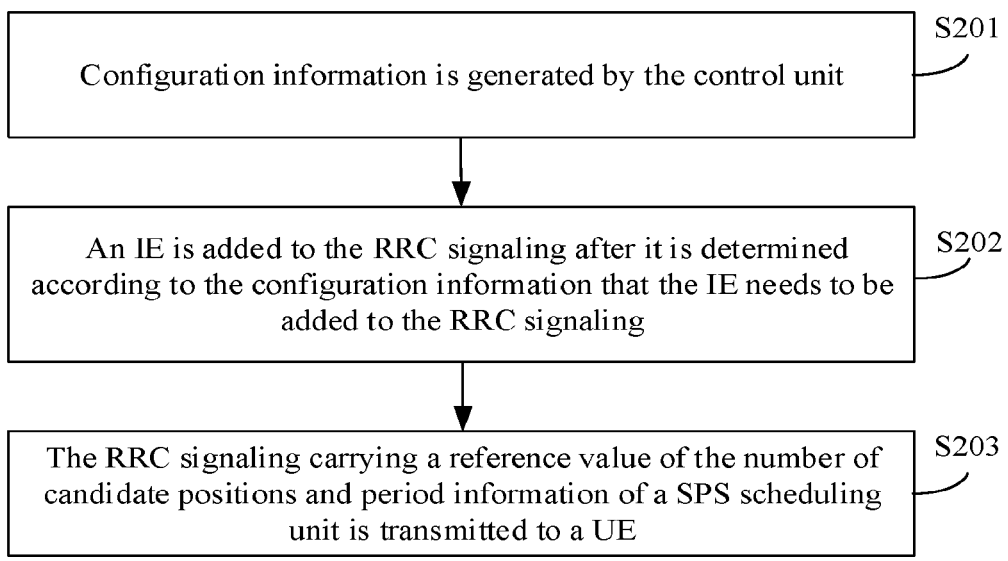
FIG. 2 illustrates a flowchart of another method for transmitting information according to an exemplary embodiment of the present disclosure.

FIG. 2 is a flowchart of another method for transmitting information according to an exemplary embodiment of the present disclosure. As illustrated in FIG. 2, the method may include the following steps.

In step S201, configuration information is generated by a control unit, the configuration information being configured to indicate whether an IE needs to be added to RRC signaling.

In step S202, the IE is added to the RRC signaling after it is determined according to the configuration information that the IE needs to be added to the RRC signaling.

If it is determined according to the configuration information that the IE needs to be added to the RRC signaling, the base station may transmit the reference value of the number of candidate positions through the RRC signaling.

If it is determined according to the configuration information that the IE does not need to be added to the RRC signaling, the base station neither transmits the reference value of the number of candidate positions through the RRC signaling nor transmits the reference value of the number of candidate positions through DCI.

In step S203, the RRC signaling carrying the reference value of the number of candidate positions and period information of a SPS scheduling unit is transmitted to a UE.

In the above embodiment, through determining according to the configuration information that the IE needs to be added to the RRC signaling, adding the IE configured to indicate the reference value of the number of candidate positions for the SPS scheduling unit of the UE to the RRC signaling, and transmitting the RRC signaling carrying the reference value of the number of candidate positions and the period information of the SPS scheduling unit to the UE, the UE may determine the number of candidate positions according to the received RRC signaling, and receive the SPS scheduling unit at a candidate position, thereby reducing the number of times of scheduling the SPS scheduling unit, and reducing the waste of public control channel resources.

Figure 3:
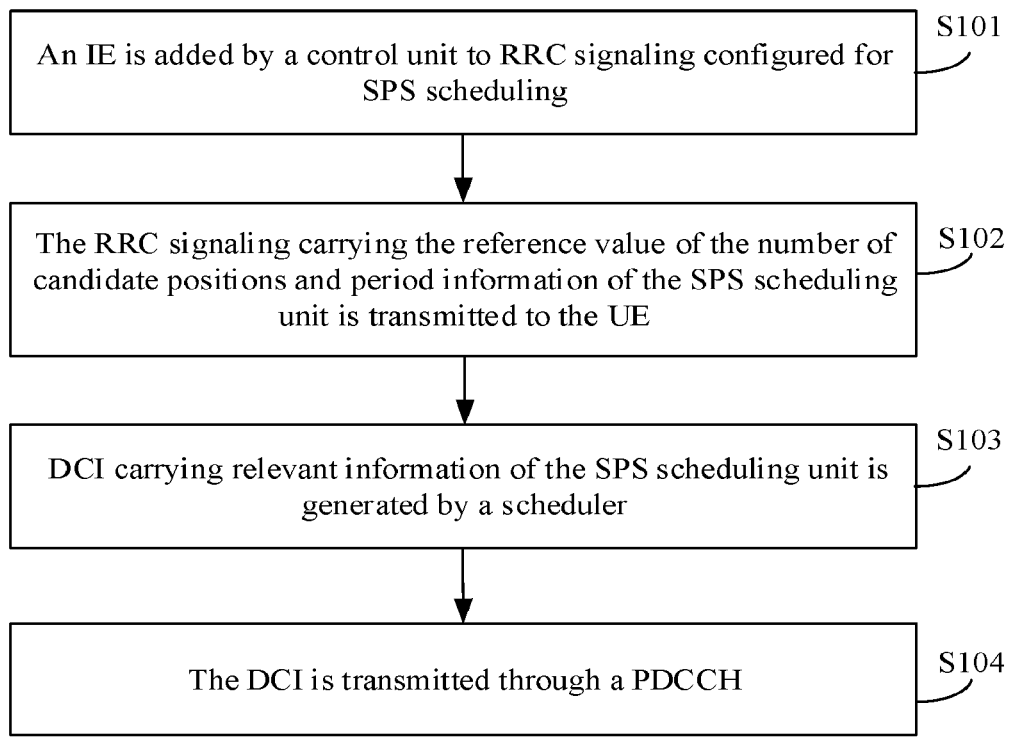
FIG. 3 is a flowchart of another method for transmitting information according to an exemplary embodiment of the present disclosure.

FIG. 3 is a flowchart of another method for transmitting information according to an exemplary embodiment of the present disclosure. As illustrated in FIG. 3, the method may further include the following steps.

In step S103, DCI carrying relevant information of the SPS scheduling unit is generated by a scheduler, the relevant information of the SPS scheduling unit including the number of candidate positions, or the relevant information of the SPS scheduling unit including the number of candidate positions and a position spacing of the SPS scheduling unit.

The base station may further include the scheduler. The scheduler may generate, according to a channel interference situation, the DCI carrying the relevant information of the SPS scheduling unit. The SPS scheduling unit may include, but not limited to, an SPS frame or an SPS time slot or the like. The relevant information of the SPS scheduling unit may include the number of candidate positions, or may include the number of candidate positions and the position spacing of the SPS scheduling unit.

The reference value of the number of candidate positions and the number of candidate positions may be the same (for example, both are 2), or may be different. For example, the reference value of the number of candidate positions is 2, and the number of candidate positions is 1.

When the UE receives the DCI carrying the number of candidate positions, the number of candidate positions acquired from the DCI will be used as it is.

In step S104, the DCI is transmitted through a PDCCH.

In the above embodiment, through transmitting, through the PDCCH, the DCI carrying the relevant information of the SPS scheduling unit, the UE may determine the number of candidate positions according to the received DCI, and receive the SPS scheduling unit at a candidate position, thereby reducing the number of times of scheduling the SPS scheduling unit, and reducing the waste of public control channel resources.

Figure 4:
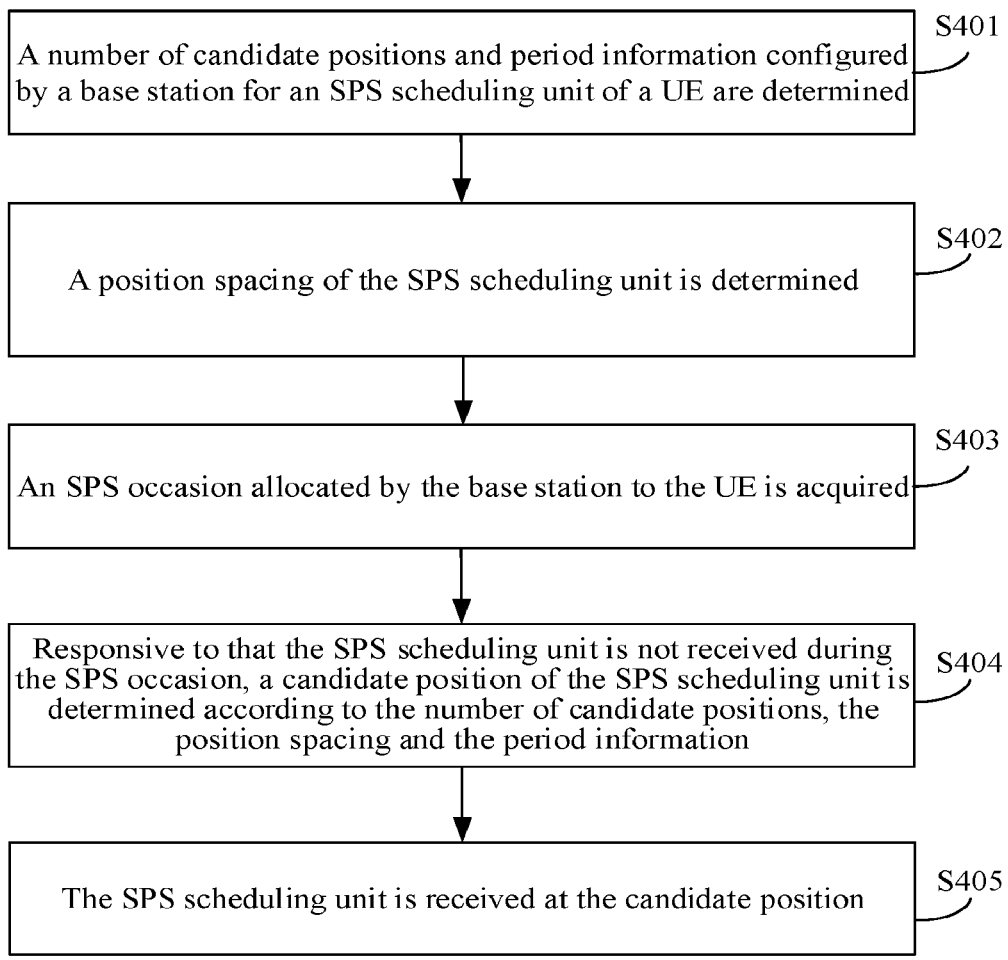
FIG. 4 illustrates a flowchart of a method for demodulating an SPS scheduling unit according to an exemplary embodiment of the present disclosure.

FIG. 4 illustrates a flowchart of a method for demodulating an SPS scheduling unit according to an exemplary embodiment of the present disclosure. The embodiment is described from a UE side, and the method may include the following steps.

In step S401, a number of candidate positions and period information configured by a base station for an SPS scheduling unit of a UE are determined.

The UE may determine the number of candidate positions and the period information configured by the base station for the SPS scheduling unit of the UE in a variety of manners, such as the following manners.

In Manner 1, the number of candidate positions and the period information are determined according to the received RRC signaling. In the embodiment, the RRC signaling transmitted by the base station and configured for the SPS scheduling may be received. the reference value of the number of candidate positions and the period information are parsed from the RRC signaling. The reference value of the number of candidate positions is determined as the number of candidate positions.

In Manner 2, the number of candidate positions and the period information are determined according to the received DCI. In the embodiment, the UE may first receive the RRC signaling transmitted by the base station, then receives the DCI transmitted by the base station through the PDCCH, and demodulate the DCI to obtain the number of candidate positions.

In the above embodiment, the number of candidate positions and the period information configured by the base station for the SPS scheduling unit of the UE may be determined in a variety of manners, such that the implementation methods are flexible and diverse.

In step S402, a position spacing of the SPS scheduling unit is determined. In the embodiment, the position spacing may be determined based on an agreed manner, or the received DCI may be demodulated to obtain the position spacing.

In step S403, an SPS occasion allocated by the base station to the UE is acquired.

In step S404, responsive to that the SPS scheduling unit is not received during the SPS occasion, a candidate position of the SPS scheduling unit is determined according to the number of candidate positions, the position spacing and the period information. For the current period, assuming that the number of candidate positions is 1, there may be one candidate position for transmitting the SPS scheduling unit such as the SPS frame. Assuming that the main position for transmitting the SPS scheduling unit such as the SPS frame is the position 1, the determined position spacing is σ, and the position 1+σ is the position 2, it may be determined that the candidate position is the position 2.

In step S405, the SPS scheduling unit is received at the candidate position. If the SPS scheduling unit is not receive during the allocated SPS occasion, the UE may determine the candidate position of the SPS scheduling unit according to the number of candidate positions, the position spacing and the period information, and receive the SPS scheduling unit at the candidate position. Assuming that there are two candidate positions, the SPS scheduling unit such as the SPS frame may be received first at the candidate position 1. If the SPS scheduling unit such as the SPS frame is not received at the candidate position 1, the SPS scheduling unit such as the SPS frame may be received at the candidate position 2.

In the above embodiment, if the SPS scheduling unit is not received during the allocated SPS occasion, the candidate position of the SPS scheduling unit is determined according to the received number of candidate positions, the position spacing and the period information, and the SPS scheduling unit is received at the candidate position, such that the number of times that the base station schedules the SPS scheduling unit is reduced, and the waste of public control channel resources is reduced.

Figure 5:
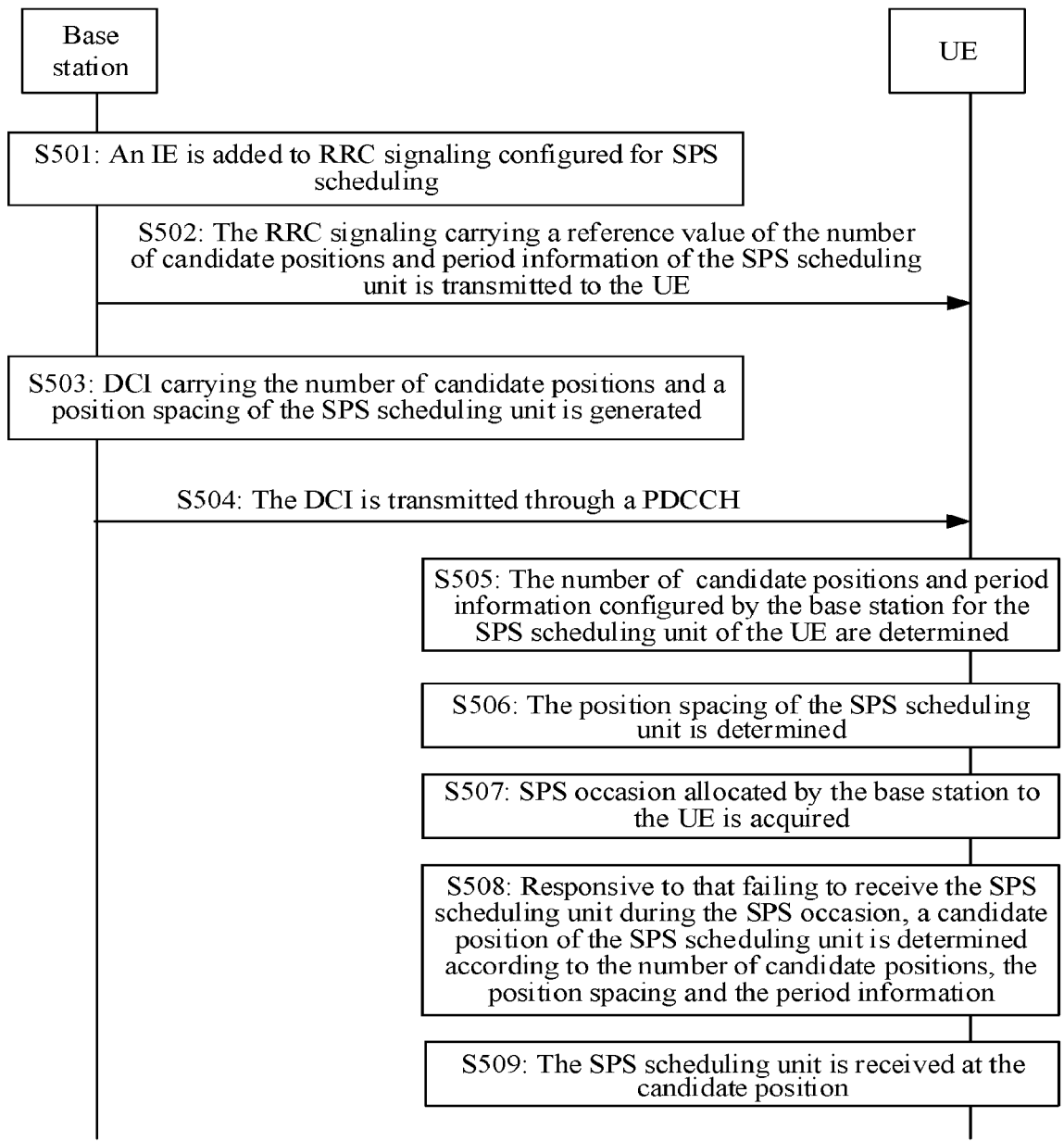
FIG. 5 illustrates a signaling flowchart of a method for demodulating an SPS scheduling unit according to an exemplary embodiment of the present disclosure.

FIG. 5 illustrates a signaling flowchart of a method for demodulating an SPS scheduling unit according to an exemplary embodiment of the present disclosure. The embodiment is described from the perspective of interaction between a base station and a UE. As illustrated in FIG. 5, the method may include the following steps.

In step S501, a control unit of a base station adds an IE to RRC signaling configured for SPS scheduling, the IE being configured to indicate a reference value of the number of candidate positions for an SPS scheduling unit of a UE.

In step S502, the control unit of the base station transmits RRC signaling carrying the reference value of the number of candidate positions and period information of the SPS scheduling unit to the UE.

In step S503, a scheduler of the base station generates DCI carrying the number of candidate positions and a position spacing of the SPS scheduling unit.

In step S504, the scheduler of the base station transmits the DCI through a PDCCH.

In step S505, the UE determines the number of candidate positions and the period information configured by the base station for the SPS scheduling unit of the UE.

In step S506, the UE determines the position spacing of the SPS scheduling unit.

In step S507, the UE acquires an SPS occasion which is allocated by the base station to the UE.

In step S508, responsive to that the SPS scheduling unit is not received during the SPS occasion, the UE determines a candidate position of the SPS scheduling unit according to the number of candidate positions, the position spacing and the period information.

In step S509, the UE receives the SPS scheduling unit at the candidate position.

In the above embodiment, through the interaction between the base station and the UE, the UE may determine the number of candidate positions according to the received DCI, and receive the SPS scheduling unit at the candidate position, thereby reducing the number of times that the base station schedules the SPS scheduling unit, and reducing the waste of public control channel resources.

Figure 6:
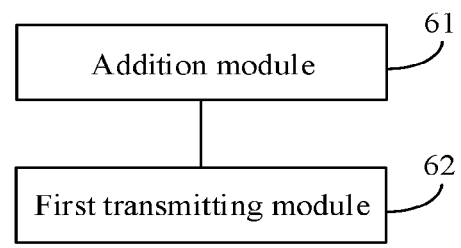
FIG. 6 illustrates a block diagram of an apparatus for transmitting information according to an exemplary embodiment.

FIG. 6 illustrates a block diagram of an apparatus for transmitting information according to an exemplary embodiment. The apparatus may be located in a base station. As illustrated in FIG. 6, the apparatus may include an addition module 61 and a first transmitting module 62. Of course, it should be understood that one or more of the modules described in this disclosure can be implemented by circuitry.

The addition module 61 is configured to add an IE to RRC signaling configured for SPS scheduling, the IE being configured to indicate a reference value of a number of candidate positions for an SPS scheduling unit of a UE. In the embodiment, the IE may be added to the RRC signaling configured for the SPS scheduling. The IE is configured to indicate the reference value of the number of candidate positions for the SPS scheduling unit of the UE.

The first transmitting module 62 is configured to transmit RRC signaling carrying the reference value added by the addition module 61 of the number of candidate positions and period information of the SPS scheduling unit to the UE.

Both the addition module 61 and the first transmitting module 62 may be located in a control unit of the base station.

After the IE configured to indicate the reference value of the number of candidate positions for the SPS scheduling unit of the UE is added to the RRC signaling configured for the SPS scheduling, the RRC signaling carrying the reference value of the number of candidate positions and the period information of the SPS scheduling unit may be transmitted to the UE.

In the above embodiment, through adding the IE configured to indicate the reference value of the number of candidate positions for the SPS scheduling unit of the UE to the RRC signaling configured for the SPS scheduling, and transmitting the RRC signaling carrying the reference value of the number of candidate positions and the period information of the SPS scheduling unit to the UE, the UE may determine the number of candidate positions according to the received RRC signaling, and receive the SPS scheduling unit at the candidate position, thereby reducing the number of times of scheduling the SPS scheduling unit, and reducing the waste of public control channel resources.

Figure 7:
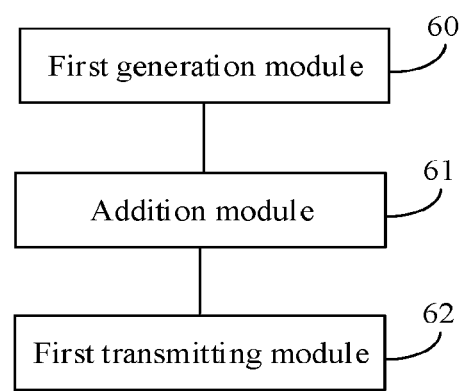
FIG. 7 illustrates a block diagram of another apparatus for transmitting information according to an exemplary embodiment.

FIG. 7 illustrates a block diagram of another apparatus for transmitting information according to an exemplary embodiment. As illustrated in FIG. 7, based on the embodiment illustrated in FIG. 6, the apparatus may further include a first generation module 60.

The first generation module 60 is configured to generate configuration information, the configuration information being configured to indicate whether the IE needs to be added to the RRC signaling.

The addition module 61 may be configure to add the IE to the RRC signaling after determining according to the configuration information generated by the first generation module 60 that the IE needs to be added to the RRC signaling.

If it is determined according to the configuration information that the IE needs to be added to the RRC signaling, the base station may send the reference value of the number of candidate positions through the RRC signaling.

If it is determined according to the configuration information that the IE does not need to be added to the RRC signaling, the base station neither transmits the reference value of the number of candidate positions through the RRC signaling nor transmits the reference value of the number of candidate positions through DCI.

In the above embodiment, through determining according to the configuration information that the IE needs to be added to the RRC signaling, adding the IE configured to indicate the reference value of the number of candidate positions for the SPS scheduling unit of the UE to the RRC signaling, and transmitting the RRC signaling carrying the reference value of the number of candidate positions and the period information of the SPS scheduling unit to the UE, the UE may determine the number of candidate positions according to the received RRC signaling, and receive the SPS scheduling unit at the candidate position, thereby reducing the number of times of scheduling the SPS scheduling unit, and reducing the waste of public control channel resources.

Figure 8:
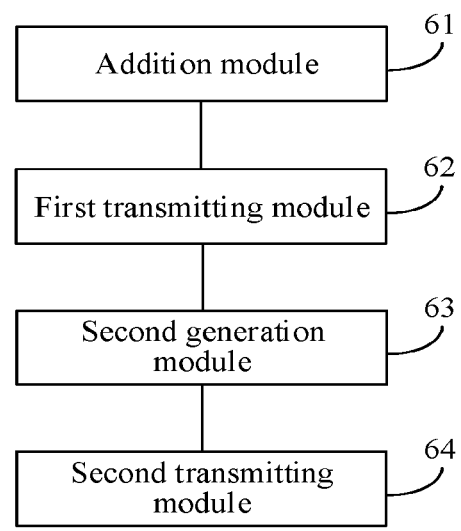
FIG. 8 illustrates a block diagram of another apparatus for transmitting information according to an exemplary embodiment.

FIG. 8 illustrates a block diagram of another apparatus for transmitting information according to an exemplary embodiment. As illustrated in FIG. 8, based on the embodiment illustrated in FIG. 6, the apparatus may further include a second generation module 63 and a second transmitting module 64.

The second generation module 63 is configured to generate DCI which carries relevant information of the SPS scheduling unit, the relevant information of the SPS scheduling unit including the number of candidate positions, or the relevant information of the SPS scheduling unit including the number of candidate positions and a position spacing of the SPS scheduling unit. The SPS scheduling unit may include, but not limited to, an SPS frame or an SPS time slot or the like. The relevant information of the SPS scheduling unit may include the number of candidate positions, or may include the number of candidate positions and the position spacing of the SPS scheduling unit.

The reference value of the number of candidate positions and the number of candidate positions may be the same (for example, both are 2), or may be different. For example, the reference value of the number of candidate positions is 2, and the number of candidate positions is 1.

The second transmitting module 64 is configured to transmit, through a PDCCH, the DCI generated by the second generation module 63.

Both the second generation module 63 and the second transmitting module 64 may be located in a scheduler of the base station.

In the above embodiment, through transmitting, through the PDCCH, the DCI carrying the relevant information of the SPS scheduling unit, the UE may determine the number of candidate positions according to the received DCI, and receive the SPS scheduling unit at the candidate position, thereby reducing the number of times of scheduling the SPS scheduling unit, and reducing the waste of public control channel resources.

Figure 9:
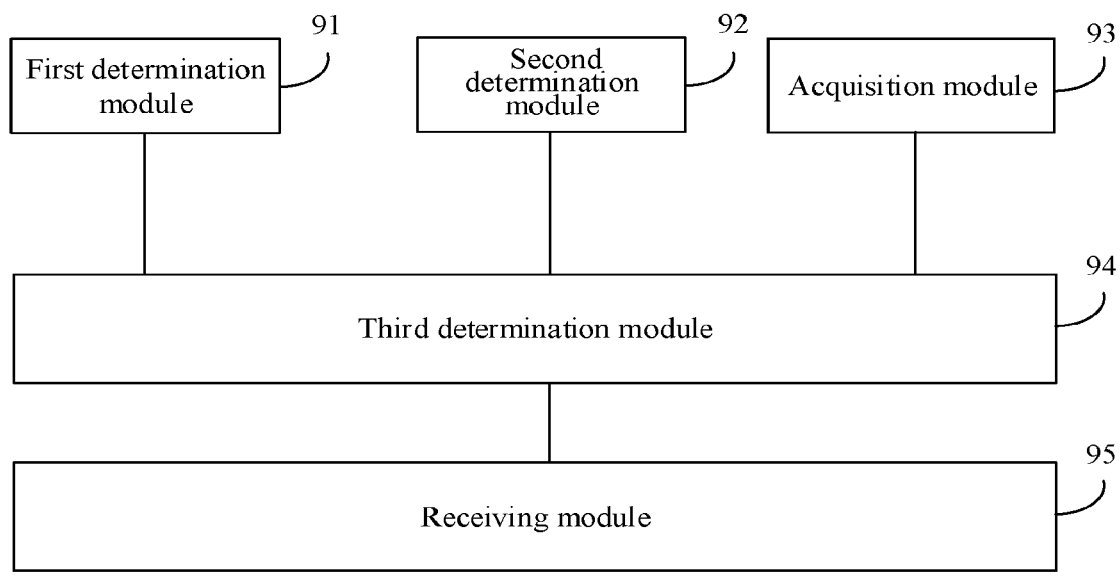
FIG. 9 illustrates a block diagram of an apparatus for demodulating an SPS scheduling unit according to an exemplary embodiment.

FIG. 9 illustrates a block diagram of an apparatus for demodulating an SPS scheduling unit according to an exemplary embodiment. The apparatus may be located in a UE. As illustrated in FIG. 9, the apparatus may include: a first determination module 91, a second determination module 92, an acquisition module 93, a third determination module 94 and a receiving module 95.

The first determination module 91 is configured to determine a number of candidate positions and period information configured by a base station for an SPS scheduling unit of the UE.

The second determination module 92 is configured to determine a position spacing of the SPS scheduling unit.

The acquisition module 93 is configured to acquire an SPS occasion which is allocated by the base station to the UE.

The third determination module 94 is configured to determine, responsive to that the SPS scheduling unit is not received during the SPS occasion acquired by the acquisition module 93, a candidate position of the SPS scheduling unit according to the number of candidate positions determined by the first determination module 91, the period information and the position spacing determined by the second determination module 92.

The receiving module 95 is configured to receive the SPS scheduling unit at the candidate position determined by the third determination module 94.

If the SPS scheduling unit is not received during the allocated SPS occasion, the UE may determine the candidate position of the SPS scheduling unit according to the number of candidate positions, the position spacing and the period information, and receive the SPS scheduling unit at the candidate position. Assuming that there are two candidate positions, the SPS scheduling unit such as the SPS frame may be received first at the candidate position 1. If the SPS scheduling unit such as the SPS frame is not received at the candidate position 1, the SPS scheduling unit such as the SPS frame may be received at the candidate position 2.

In the above embodiment, if the SPS scheduling unit is not received within the allocated SPS occasion, the candidate position of the SPS scheduling unit is determined according to the received number of candidate positions, the position spacing and the period information, and the SPS scheduling unit is received at the candidate position, such that the number of times that the base station schedules the SPS scheduling unit is reduced, and the waste of public control channel resources is reduced.

Figure 10:
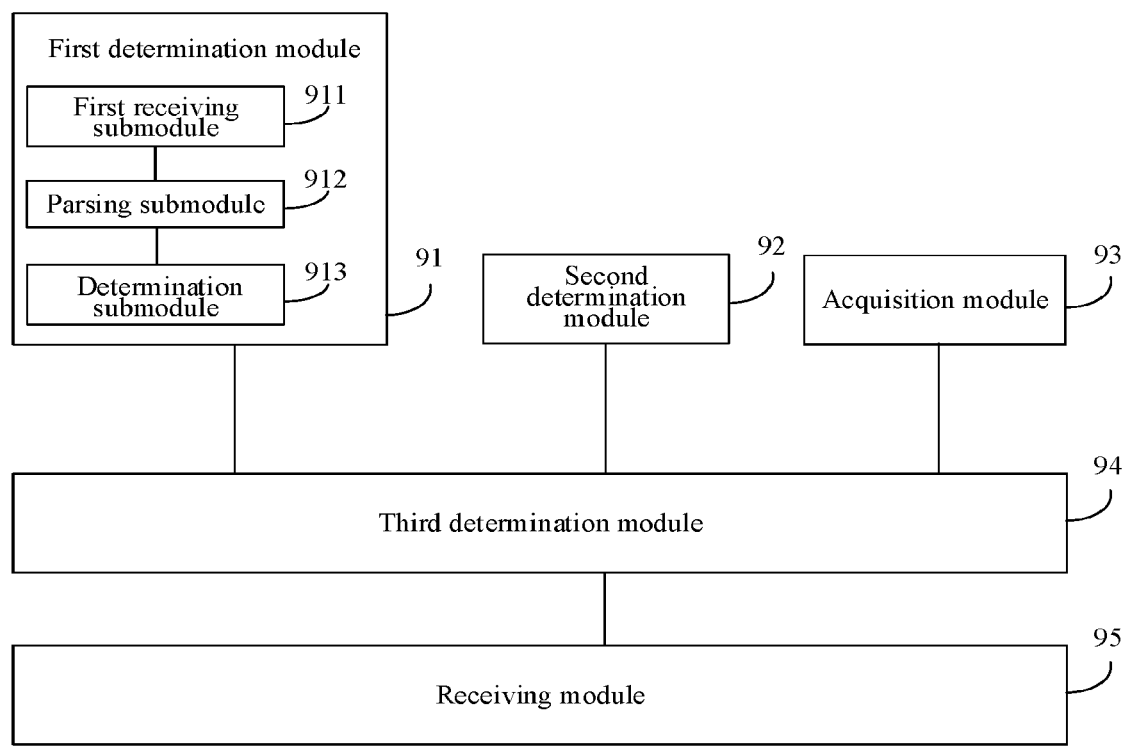
FIG. 10 illustrates a block diagram of another apparatus for demodulating an SPS scheduling unit according to an exemplary embodiment.

FIG. 10 illustrates a block diagram of another apparatus for demodulating an SPS scheduling unit according to an exemplary embodiment. As illustrated in FIG. 10, based on the embodiment illustrated in FIG. 9, the first determination module 91 may include a first receiving submodule 911, a parsing submodule 912 and a determination submodule 913.

The first receiving submodule 911 is configured to receive RRC signaling which is transmitted by the base station and configured for SPS scheduling.

The parsing submodule 912 is configured to parse a reference value of the number of candidate positions and the period information from the RRC signaling received by the first receiving submodule 911.

The determination submodule 913 is configured to determine the reference value of the number of candidate positions that is parsed from the parsing submodule 912 as the number of candidate positions.

In the above embodiment, by receiving the RRC signaling which is transmitted by the base station and configured for the SPS scheduling, parsing the reference value of the number of candidate positions and the period information from the RRC signaling, and determining the reference value of the number of candidate positions as the number of candidate positions, the implementation manner is simple.

Figure 11:
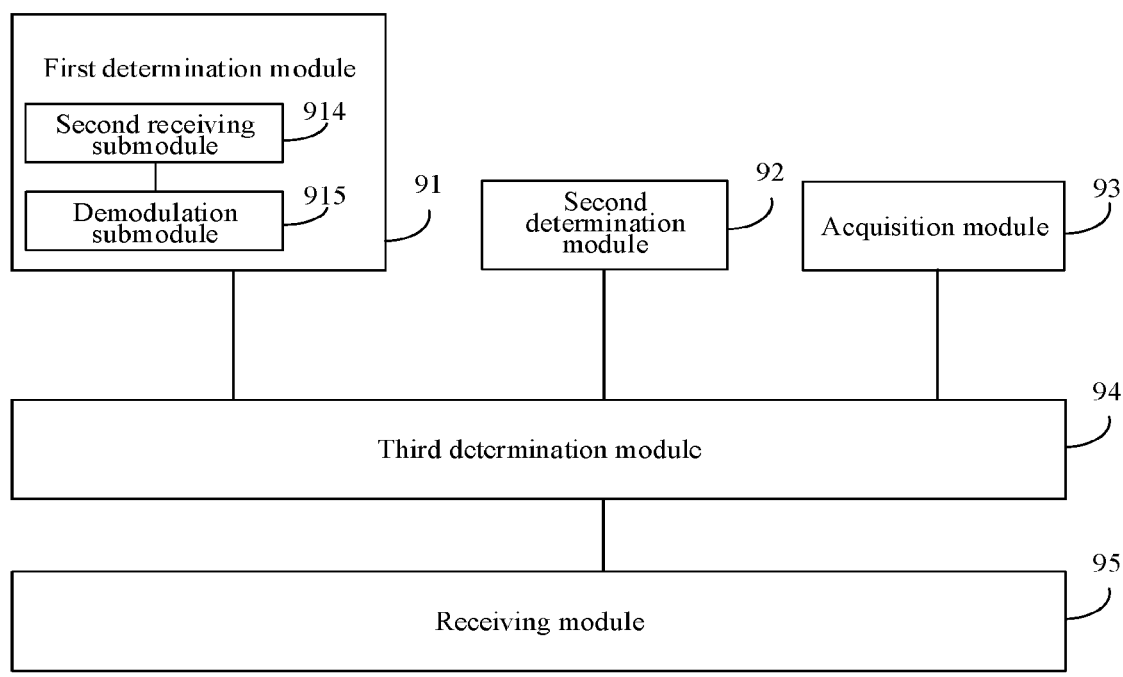
FIG. 11 illustrates a block diagram of another apparatus for demodulating an SPS scheduling unit according to an exemplary embodiment.

FIG. 11 illustrates a block diagram of another apparatus for demodulating an SPS scheduling unit according to an exemplary embodiment. As illustrated in FIG. 11, based on the embodiment illustrated in FIG. 9, the first determination module 91 may include a second receiving submodule 914 and a demodulation submodule 915.

The second receiving submodule 914 is configured to receive DCI which is transmitted by the base station through a PDCCH.

The demodulation submodule 915 is configured to demodulate the DCI received by the second receiving submodule 914 to obtain the number of candidate positions.

In the above embodiment, by receiving the DCI transmitted by the base station through the PDCCH, and demodulating the DCI to obtain the number of candidate positions, the implementation manner is simple.

Figure 12:
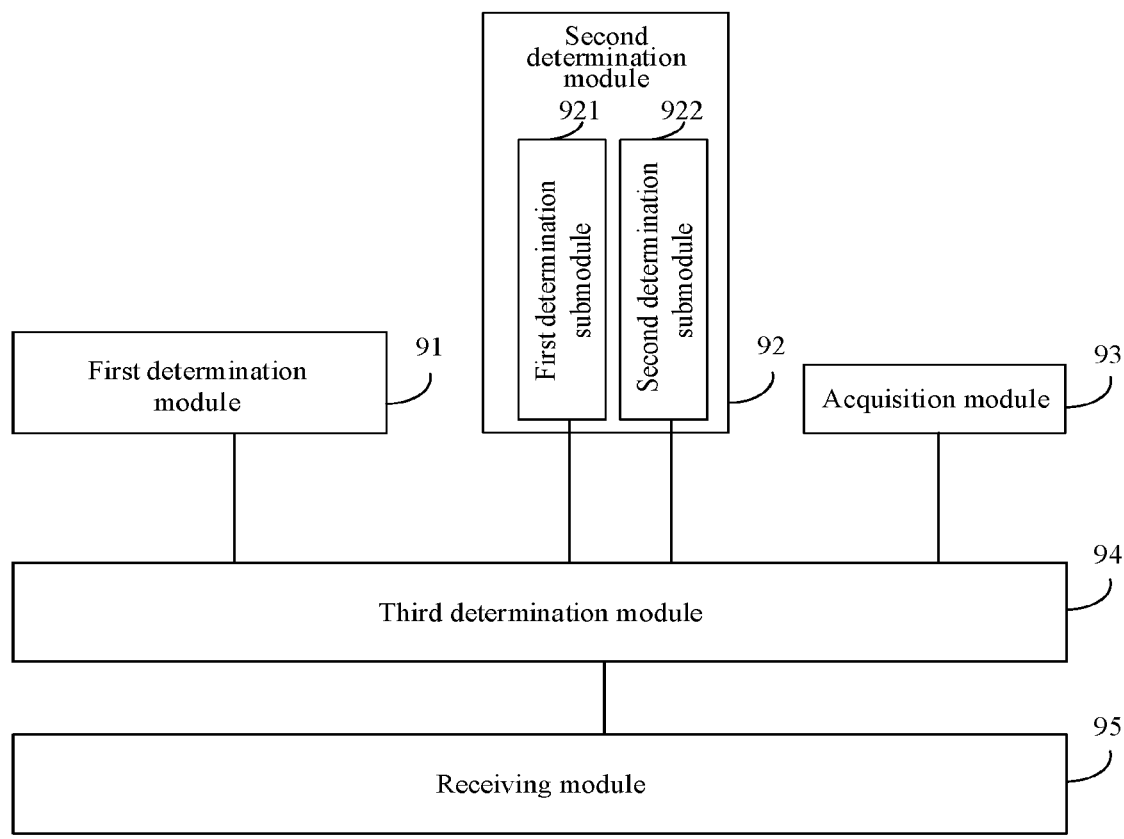
FIG. 12 illustrates a block diagram of another apparatus for demodulating an SPS scheduling unit according to an exemplary embodiment.

FIG. 12 illustrates a block diagram of another apparatus for demodulating an SPS scheduling unit according to an exemplary embodiment. As illustrated in FIG. 12, based on the embodiment illustrated in FIG. 9, the second determination module 92 may include a first determination submodule 921 or a second determination submodule 922.

The first determination submodule 921 is configured to determine the position spacing based on an agreed manner.

The second determination submodule 922 is configured to demodulate from the received DCI to obtain the position spacing.

In the embodiment, the position spacing may be determined based on an agreed manner, or the received DCI may be demodulated to obtain the position spacing. Further, in the above embodiment, by determining the position spacing based on the agreed manner, or demodulating the received DCI to obtain the position spacing, the implementation manners are flexible and diverse.

Figure 13:
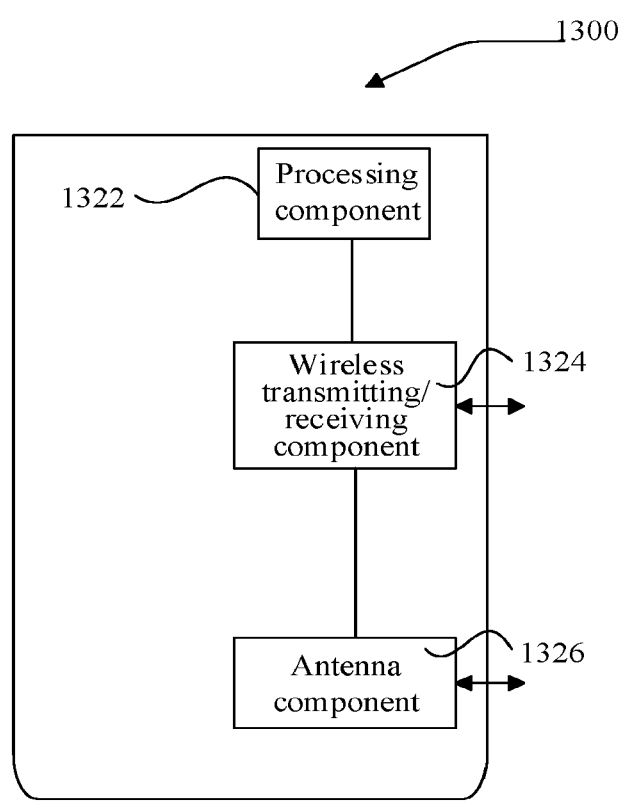
FIG. 13 illustrates a block diagram of an apparatus suitable for transmitting information according to an exemplary embodiment.

FIG. 13 illustrates a block diagram of an apparatus suitable for transmitting information according to an exemplary embodiment. The apparatus 1300 may be provided as a base station. Referring to FIG. 13, the apparatus 1300 includes a processing component 1322, a wireless transmitting/receiving component 1324, an antenna component 1326, and a signal processing portion special for a wireless interface. The processing component 1322 may further include one or more processors.

One processor in the processing component 1322 may be configured to add, by a control unit, an IE to RRC signaling configured for SPS scheduling, the IE being configured to indicate a reference value of the number for candidate positions of an SPS scheduling unit of a UE, and transmit RRC signaling carrying the reference value of the number of candidate positions and period information of the SPS scheduling unit to the UE.

In an exemplary embodiment, there is provided a non-transitory computer-readable storage medium including instructions. The instructions may be executed by the processing component 1322 of the apparatus 1300 to complete the above method for transmitting the information. For example, the non-transitory computer-readable storage medium may be a Read Only Memory (ROM), a Random Access Memory (RAM), a Compact Disc Read-Only Memory (CD-ROM), a magnetic tape, a floppy disc, an optical data storage device and the like.

Figure 14:
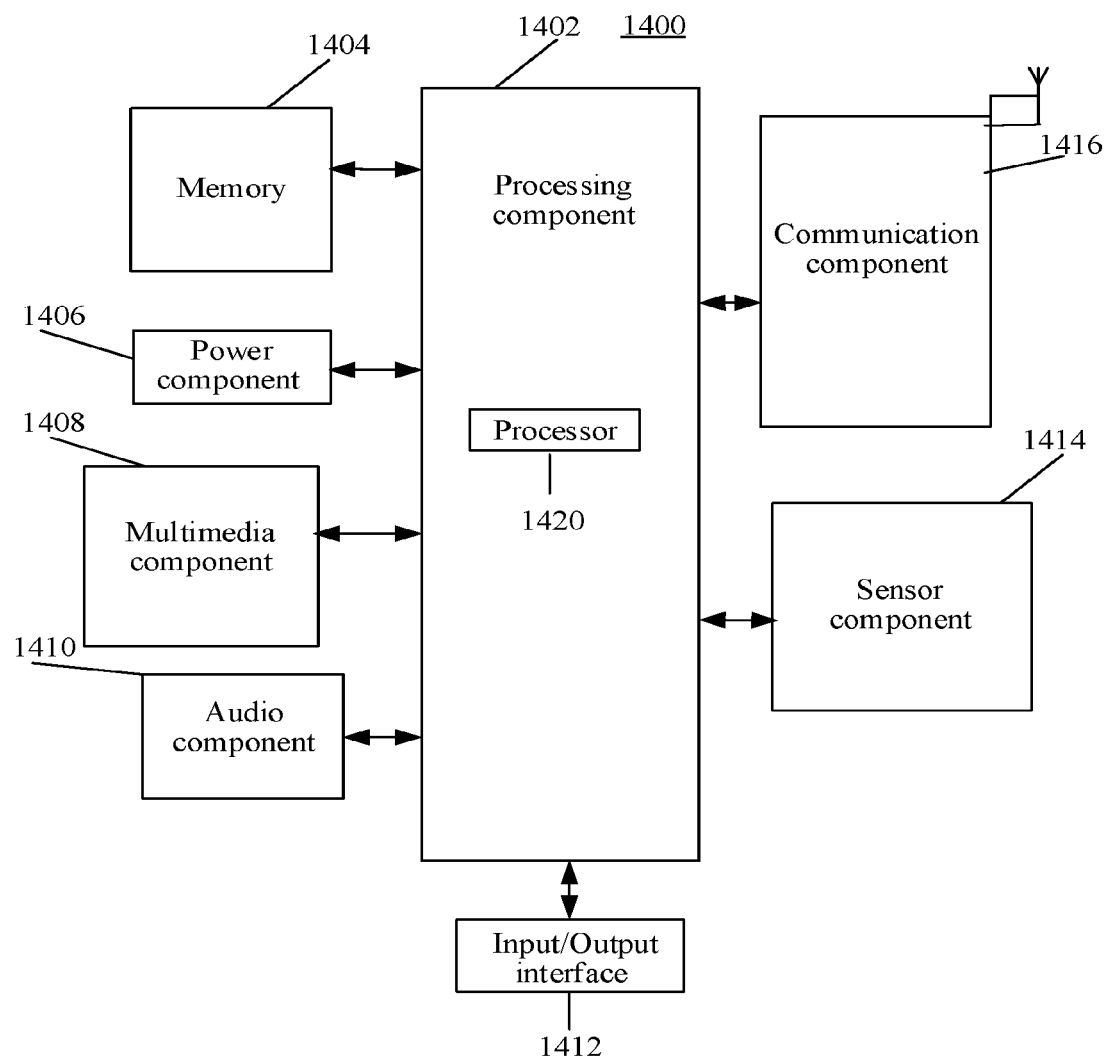
FIG. 14 illustrates a block diagram of an apparatus suitable for demodulating an SPS scheduling unit according to an exemplary embodiment.

FIG. 14 illustrates a block diagram of an apparatus suitable for demodulating an SPS scheduling unit according to an exemplary embodiment. For example, the apparatus 1400 may be a mobile phone, a computer, a digital broadcast terminal, a messaging device, a gaming console, a tablet, a medical device, exercise equipment, a Personal Digital Assistant (PDA), and the like.

Referring to FIG. 14, the apparatus 1400 may include one or more of the following components: a processing component 1402, a memory 1404, a power component 1406, a multimedia component 1408, an audio component 1410, an Input/Output (I/O) interface 1412, a sensor component 1414, and a communication component 1416.

The processing component 1402 typically controls overall operations of the apparatus 1400, such as the operations associated with display, telephone calls, data communications, camera operations, and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

One processor 1420 in the processing component 1402 may be configured to determine the number of candidate positions and period information configured by a base station for an SPS scheduling unit of a UE, determine a position spacing of the SPS scheduling unit, and acquire an SPS occasion which is allocated by the base station to the UE. The processing component 1402 may be further configured to determine, responsive to that the SPS scheduling unit is not received during the SPS occasion, a candidate position of the SPS scheduling unit according to the number of candidate positions, the position spacing and the period information, and receive the SPS scheduling unit at the candidate position.

The memory 1404 is configured to store various types of data to support the operation of the apparatus 1400. Examples of such data include instructions for any applications or methods operated on the apparatus 1400, contact data, phonebook data, messages, pictures, video, and the like. The memory 1404 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 1406 provides power to various components of the apparatus 1400. The power component 1406 may include a power management system, one or more power sources, and any other components associated with the generation, management, and distribution of power in the apparatus 1400.

The multimedia component 1408 includes a screen providing an output interface between the apparatus 1400 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1408 includes a front camera and/or a rear camera. The front camera and/or the rear camera may receive external multimedia data when the apparatus 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a Microphone (MIC) configured to receive an external audio signal when the apparatus 1400 is in an operation mode, such as a call mode, a recording mode, and a voice recognition mode. The received audio signal may further be stored in the memory 1404 or transmitted via the communication component 1416. In some embodiments, the audio component 1410 further includes a speaker configured to output audio signals.

The I/O interface 1412 provides an interface between the processing component 1402 and peripheral interface modules. The peripheral interface modules may be a keyboard, a click wheel, buttons, and the like. The buttons may include, but are not limited to, a home button, a volume button, a starting button, and a locking button.

The sensor component 1414 includes one or more sensors to provide status assessments of various aspects of the apparatus 1400. For instance, the sensor component 1414 may detect an on/off status of the apparatus 1400 and relative positioning of components, such as a display and small keyboard of the apparatus 1400, and the sensor component 1414 may further detect a change in a position of the apparatus 1400 or a component of the apparatus 1400, presence or absence of contact between the user and the apparatus 1400, orientation or acceleration/deceleration of the apparatus 1400 and a change in temperature of the apparatus 1400. The sensor component 1414 may include a proximity sensor, configured to detect the presence of nearby objects without any physical contact. The sensor component 1414 may also include a light sensor, such as a Complementary Metal Oxide Semiconductor (CMOS) or Charge Coupled Device (CCD) image sensor, configured for use in an imaging application. In some embodiments, the sensor component 1414 may also include an accelerometer sensor, a gyroscope sensor, a magnetic sensor, a pressure sensor, or a temperature sensor.

The communication component 1416 is configured to facilitate communication, wired or wirelessly, between the apparatus 1400 and other devices. The apparatus 1400 may access any communication-standard-based wireless network, such as Wi-Fi network, a 2nd-Generation (2G), or 3rd-Generation (3G) network, or a combination thereof. In an exemplary embodiment, the communication component 1416 receives a broadcast signal or broadcast associated information from an external broadcast management system via a broadcast channel. In an exemplary embodiment, the communication component 1416 further includes a near field communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary embodiments, the apparatus 1400 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic components, for performing the above described methods.

In an exemplary embodiment, a non-transitory computer readable storage medium including an instruction is further provided, for example, the memory 1404 including the instruction; and the instruction may be executed by the processing component 1420 of the apparatus 1400 to complete the above method. For example, the non-transitory computer-readable storage medium may be a Read Only Memory (ROM), a Random Access Memory (RAM), a Compact Disc Read-Only Memory (CD-ROM), a magnetic tape, a floppy disc, an optical data storage device and the like.

The device embodiment is basically corresponding to the method embodiment, so relevant part may be referred to the description in the method embodiment. The above described device embodiment is merely schematic. The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments. Those of ordinary skill in the art may understand and implement the present disclosure.

It should be noted that the relational terms such as first and second may be used herein solely to distinguish one entity or action from another entity or action without necessarily requiring or implying any actual such relationship or order between such entities or actions. The terms "comprises", "comprising" or any other variation thereof are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Other embodiments of the present disclosure will be apparent to those skilled in the art from consideration of the specification and practice of the present disclosure disclosed here. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It should be understood that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for demodulating a Semi-Persistent Scheduling (SPS) scheduling unit that is applicable to User Equipment (UE), the method comprising:
   determining a number of candidate positions and period information configured by a base station for an SPS scheduling unit of the UE;
   determining a position spacing of the SPS scheduling unit;
   acquiring an SPS occasion which is allocated by the base station to the UE;
   determining a candidate position of the SPS scheduling unit based on the number of candidate positions, the position spacing, and the period information when the SPS scheduling unit is not received during the SPS occasion; and
   receiving the SPS scheduling unit at the candidate position.

2. The method of claim 1, wherein determining the number of candidate positions and the period information configured by the base station for the SPS scheduling unit of the UE further comprises:
   receiving Radio Resource Control (RRC) signaling which is transmitted by the base station and configured for SPS scheduling;
   parsing a reference value of the number of candidate positions and the period information from the RRC signaling; and
   determining the reference value of the number of candidate positions as the number of candidate positions.

3. The method of claim 1, wherein determining the number of candidate positions and the period information configured by the base station for the SPS scheduling unit of the UE further comprises:
   receiving Downlink Control Information (DCI) which is transmitted by the base station through a Physical Downlink Control Channel (PDCCH), and
   demodulating the DCI to obtain the number of candidate positions.

4. The method of claim 1, wherein determining the position spacing of the SPS scheduling unit further comprises:
   determining the position spacing based on an agreed manner; or
   demodulating a received DCI to obtain the position spacing.

5. User Equipment (UE), comprising:
   a processor; and
   a memory configured to store instructions executable for the processor,
   wherein the processor is configured to:
   determine a number of candidate positions and period information configured by a base station for an SPS scheduling unit of the UE;
   determine a position spacing of the SPS scheduling unit;
   acquire an SPS occasion which is allocated by the base station to the UE;
   determine a candidate position of the SPS scheduling unit based on the number of candidate positions, the period information, and the position spacing when the SPS scheduling unit is not received during the SPS occasion; and receive the SPS scheduling unit at the candidate position.

6. The UE of claim 5, wherein the processor is further configured to:

receive Radio Resource Control (RRC) signaling which is transmitted by the base station and configured for SPS scheduling;

a parse a reference value of the number of candidate positions and the period information from the RRC signaling; and determine the reference value of the number of candidate positions as the number of candidate positions.

7. The UE of claim 5, wherein the processor is further configured to:

receive Downlink Control Information (DCI) which is transmitted by the base station through a Physical Downlink Control Channel (PDCCH); and demodulate the DCI to obtain the number of candidate positions.

8. The UE of claim 5, wherein the processor is further configured to:

determine the position spacing based on an agreed manner; or demodulate a received DCI to obtain the position spacing.

9. A non-transitory computer-readable storage medium, storing computer instructions thereon, wherein the instructions are executed by a processor to implement the method for demodulating a Semi-Persistent Scheduling (SPS) scheduling unit of claim 1.

* * * * *